March 23, 1954

S. G. ISSERSTEDT

LOGARITHMIC CALCULATOR HAVING DECIMAL INDICATING MEANS 2,673,030

Filed Dec. 24, 1949

4 Sheets-Sheet 1

Inventor

SIEGFRIED G. ISSERSTEDT

By: Fetherstonhaugh & Co.

Att'ys

Inventor
SIEGFRIED G. ISSERSTEDT
By: Fetherstonhaugh & Co,
Att'ys

March 23, 1954 S. G. ISSERSTEDT 2,673,030

LOGARITHMIC CALCULATOR HAVING DECIMAL INDICATING MEANS

Filed Dec. 24, 1949 4 Sheets-Sheet 3

Inventor
SIEGFRIED G. ISSERSTEDT
By: Fetherstonhaugh & Co.
Att'ys

March 23, 1954 S. G. ISSERSTEDT 2,673,030

LOGARITHMIC CALCULATOR HAVING DECIMAL INDICATING MEANS

Filed Dec. 24, 1949 4 Sheets-Sheet 4

Inventor
SIEGFRIED G. ISSERSTEDT
By: Fetherstonhaugh & Co.
Att'ys

Patented Mar. 23, 1954 2,673,030

UNITED STATES PATENT OFFICE 2,673,030

LOGARITHMIC CALCULATOR HAVING DECIMAL INDICATING MEANS

Siegfried Gordon Isserstedt, Toronto, Ontario, Canada

Application December 24, 1949, Serial No. 134,903

1 Claim. (Cl. 235—61)

This invention relates to a calculator combining analog and digital computer instrumentalities, such that all factors including decimal points and the result including the decimal point will appear in easily readable form.

The essence and object of the present invention is to introduce into a calculator mechanical, electrical or electronic values which are proportional to the characteristic and mantissae of the logs of the numbers; then to add or subtract the mantissae of the logs using known instrumentalities and methods used in analog computers; then to add or subtract the characteristics of the logs using known instrumentalities and methods; then to provide transfer means for any characteristic appearing due to the addition or subtraction of the mantissae to the instrumentalities used for the addition of the characteristics. This may be done in many ways using resistances, condensers or mechanical devices or combinations in appropriate computing instrumentalities.

Another object of the invention is to provide decimal entry mechanisms associated with the numerical entry mechanisms in a computer so that the operator, in selecting the numbers for his calculation, may also set the decimal point for such numbers. In the practical embodiments of this invention, a series of numerical entry dials so-called, are employed, which may be rotated by the operator to indicate the number entered in each case, so that the factor entered in each dial will be apparent to the operator. The decimal entry dial or expedient which may take the form of a small arrow indicator, say, is moved to the appropriate position along the digits shown at the numerical entry dial corresponding to the true representation of the factor to be entered.

A further object of the invention is to provide a calculator of this type and which provides a decimal indicator in conjunction with the result indicator of the calculator and which is operable by the decimal entry mechanisms as well as being operatively related to the mechanisms or devices governing the numerical result indicator.

Other objects of the invention will be appreciated by a study of the following specification taken in conjunction with the accompanying drawings.

In the drawings—

Figure 1:
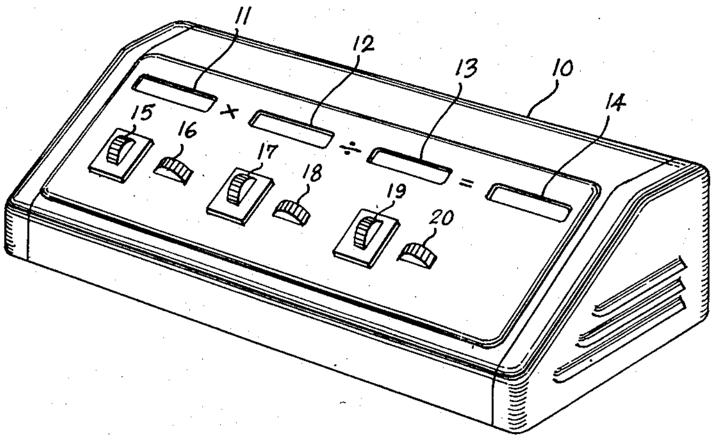
Figure 1 is a perspective view of a calculator according to the invention, housed within a suitable housing illustrating the form of the entry and result indicator dials.

Referring in detail to the drawings and particularly Figure 1, the calculator of the invention is shown within a housing 10 having numerical dial openings or windows 11, 12 and 13 and a result indicator window 14. A factor may be represented in each of the windows 11 to 14. If it is desired to multiply one factor by another, the first factor is brought into view in the window 11 by moving a suitable dial arrangement by means of the adjusting wheel 15. The decimal point on this factor may be placed by manipulating the adjusting wheel 16 to cause a small arrow or some other indicator to move into appropriate position among the digits viewable in the window 11. Then the second factor is brought into registry in the window 12 by adjusting the wheel 17 and in turn its decimal is positioned by adjusting the wheel 18. If it is desired that these two factors be divided by a third factor, then the numerical entry wheel 19 is manipulated and the decimal wheel 20 suitably manipulated to show the desired factor with its decimal point.

The result of the computation as carried out by the computing means of the calculator will be shown in the window 14, revealing the digits in the result and locating the decimal point within the digits.

It should be realized that the concept of a calculator as shown in the embodiment of Figure 1 is not practically possible unless some means of providing a carry-over device for the characteristic is included so that the decimal point located in the final result will not only be a function of the decimal point computing instrumentalities associated with the decimal entry wheels 16, 18 and 20, but will also take into account a change in numerical result corresponding to a power of 10 which may be independent of the adjustment of the decimal entry dials.

Thus if we consider a computation to find the value of $x=72,214\times 0.08203$ then $$\text{Log } 72,214 = 4.85862$$
$$\text{Log } 0.08203 = \bar{2}.91397$$

wherefor $$\log x = 3.77259$$

and $$x = 5923.63$$

It will be noted that in this computation the sum of the mantissae alone equals 1.77259 where the figure 1.00000 is a carry-over characteristic factor. It is the handling of this carry-over characteristic which is the essence of this invention in the devices hereinafter described. The decimal entry dials automatically take care of the sums of the characteristics such as 4.00000 and minus $\bar{2}.00000$, the sum of which is 2.00000. The characteristic carry-over device of the invention, however, adds the further characteristic carry-over factor whereby the resulting characteristic is the value 3.00000.

It is not particularly important what computing instrumentalities are employed for interrelating the numerical entry mechanisms to the result indicator to give the proper computation and result. For instance, summation chords and cams may be used in accordance with the teachings in my application Serial No. 692,324, filed August 22, 1946, being a co-pending application, or a suitable electrical system may be employed. Whatever system is resorted to is not material to the present invention, which concerns the concept of decimal entry mechanisms to give a result of the computation having the decimal place located therein by including in the combination of components, a carry-over device.

Figure 2:
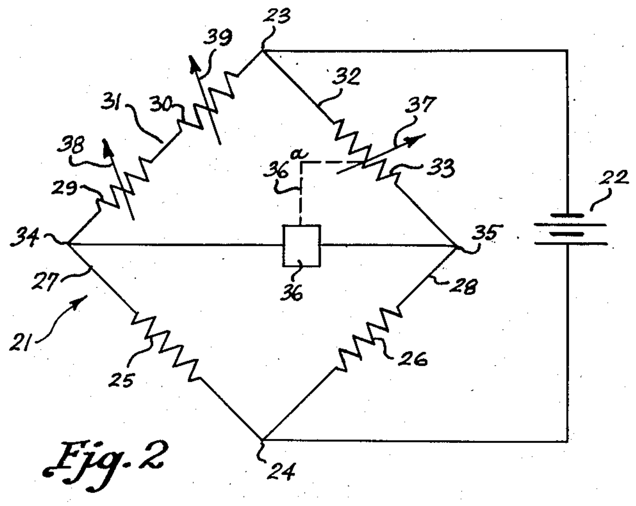
Figure 2 is a schematic illustration of a bridge circuit which may be employed as computing instrumentality either for the numerical system or the decimal system of the device of Figure 1.

A suitable electrical computing instrumentality is illustrated in Figure 2. Thus the electrical bridge arrangement 21 has a source of voltage 22 applied at the points 23 and 24 and having fixed resistances 25 and 26 in the arms 27 and 28. If two variable resistances such as resistances 29 and 30 are placed in series in the arm 31 of the bridge, then the numerical value and the resistances of each will be added to the other in the arm 31 in the electrical sense. The bridge will therefore be out of a balance until a resistance which is equal to the sum of the resistances 29 and 30 is inserted into the arm 32. This last resistance is represented by the variable resistances 33.

If the current between the points 34 and 35 of the bridge is employed to drive some device 36, this device may be operatively connected such as through the connecting means 36 to actuate the rotor 37 of the variable resistance 33 in such manner that this resistance is automatically adjusted to balance the bridge when the resistances 29 and 30 are varied.

Accordingly, it will be appreciated that if the rotors 38 and 39 are operatively related to numerical entry dials, say, then the movement of the rotor 37 required to balance the system will be a function of the movement of the rotors 38 and 39. An operatively related system between the rotor 37 and the result indicator will therefore provide a computing instrumentality.

Figure 3:
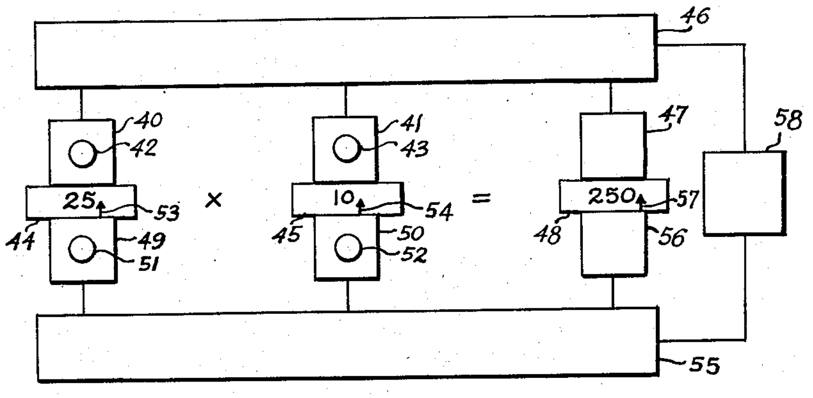
Figure 3 is a diagram of the operative relation of the units making up a complete but very simple calculator according to the invention.

In accordance with the present invention, the type of computing instrumentality illustrated in Figure 2 may be employed for the numerical system and the decimal system in the manner illustrated in Figure 3. Where used for a numerical computing system the resistances will vary in value in accordance with the logarithms of numbers on the numerical entry and result indicating dials. Thus the numerical entry devices 40 and 41 are adjustable by their manual dials or wheels 42 and 43 respectively, to provide a showing of the factors to be operated on, such as numerals 25 and 10 in the windows 44 and 45. A computing instrumentality 46 of the analog type governs operation of a result indicator device 47 showing the numerical result in the window 48.

Decimal entry devices 49 and 50 are adjustable by the knobs or wheels 51 and 52 to move a suitable indicator such as the arrow indicators 53 and 54 within the windows 44 and 45 to the appropriate position in respect to the digits viewable therein. This adjustment of the decimal entry devices operatively effects the decimal computing instrumentality 55 governing operation of a decimal result indicating device 56 which determines the position of the decimal indicator such as arrow 57 in respect to the digits of the result viewable in the window 48.

It is necessary, however, to influence the decimal result by introducing the carry-over characteristic of the numerical computation through the carry-over instrumentality 58 which is operatively related to the computing instrumentalities 46 and 55.

Figure 4:
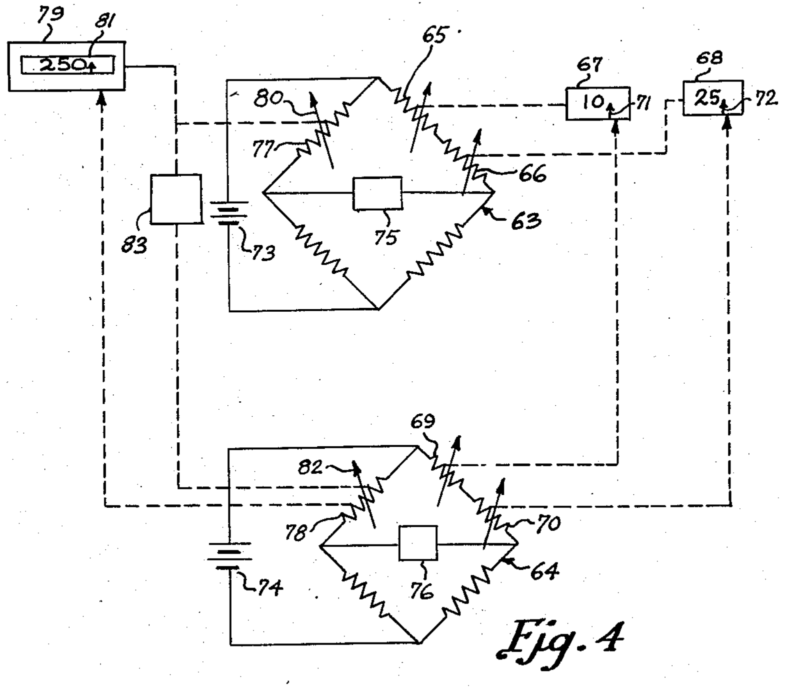
Figure 4 is a schematic illustration of the manner in which computing instrumentalities in the form of a bridge circuit such as that of Figure 2 may be employed in a calculator according to the invention.

A system according to Figure 3 for a computer employing the computing instrumentalities of Figure 2 is illustrated in Figure 4. The electrical bridge computing instrumentalities 63 and 64 are independently arranged for the numerical and decimal systems respectively within the one calculator of the analog computer class. The resistance devices 65 and 66 are manually adjusted to show suitable factors such as 10 and 25 in the windows 67 and 68 respectively. The resistance devices 69 and 70 of the decimal bridge 64 are manually adjusted to cause the decimal indicator such as arrows 71 and 72 to move to the appropriate positions in respect to the digits within the windows. A suitable mechanical arrangement is employed for this purpose so that the adjustment of each of the resistance devices simultaneously results in a showing of the numerals within the windows in a manner yet to be described. A suitable source of electrical potential is applied to each of the bridges as indicated by numerals 73 and 74 and the opposed points of the bridges are spanned by current sensitive devices 75 and 76 operatively governing the value of the resistances 77 and 78 respectively in the manner previously described but disclosed hereinafter in more detail. A result indicator 79 is operatively related to means responsive to the value of resistance 77 such as the rotor 80 thereof, whereby the digits represented within the window 81 of the result indicator 79 are representative of the result of the calculation if it be a multiplication operation applied to the factors shown in the windows 67 and 68. It will, of course, be appreciated that the resistance values of the devices 65 and 66 will be logarithmic representations of the numerical values appearing in the windows 67 and 68 and the device 77 will have to be logarithmic in nature.

The decimal computing instrumentality is similar with the exception that the decimal or characteristic values are simply added and therefore need not be of logarithmic nature. The decimal result indicator is operative by the adjusting means or rotor 82.

A carry-over instrumentality 83 operatively relates the numerical computing instrumentality and at the decimal computing instrumentality such that the value of the resistance 78 in the decimal computing instrumentality 64 is changed for each change in the numerical result indicator independent of the decimal result indicator which corresponds to a power of 10.

It should be clearly appreciated that the carry-over device may operate through electrical influence on the value of the resistance 78 in a manner yet to be described or may work by means of a mechanical system whereby the movement of the rotor 80 is operatively related to the movement of the rotor 82, in which case the carry-over devices may be a simple gear mechanism operatively relating the digit or numeral result indicator and the decimal result indicator, taking into account the fact that the decimal computing instrumentalities merely add their effect to the decimal indicator.

Figure 5:
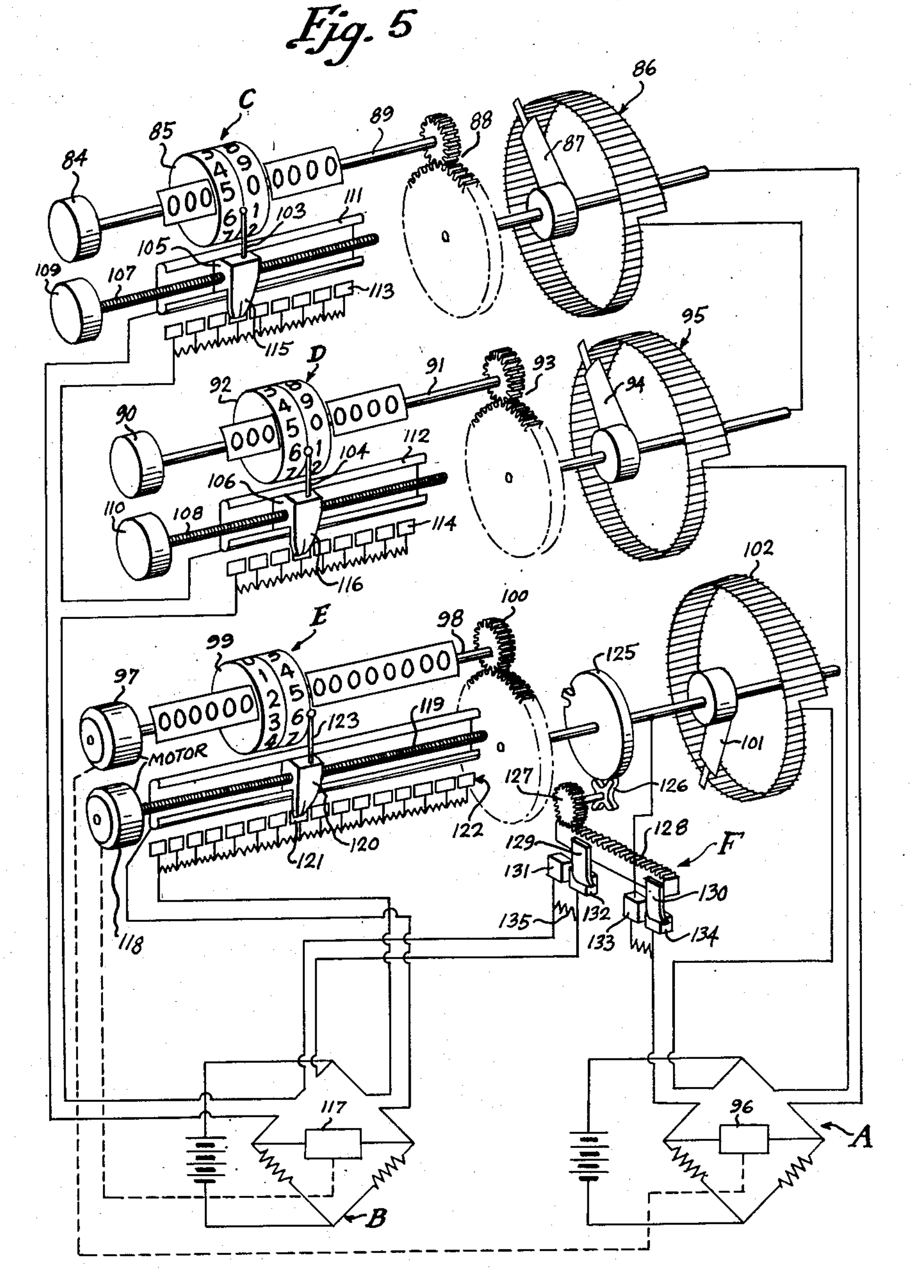
Figure 5 is a diagrammatic view of a computer mechanism according to the invention, embodying a mechanical carry-over system for the characteristic.

Referring to Figure 5, an electro-mechanical computer is shown in which the mantissa bridge circuit A solves the addition of the mantissa of numbers and the characteristic bridge circuit B solves the addition of the characteristics of numbers, both circuits working according to the principles previously discussed with reference to Figures 3 and 4. The letter C generally indicates a manual digital and analog adjustment or entry device and the letter D designates a similar device. When the knob 84 is turned to cause the numeral 5 to appear on the dial 85, a resistance proportional to the mantissa of log 5 is introduced on the tapered resistor 86 by the rotor 87 thereof actuated by gear mechanism 88 working from the shaft 89 operatively connected to the knob 84 and the dial device 85. Similarly, when the knob 90 is turned manually causing the shaft 91 to rotate, the dial 92 may be rotated to present the numeral 5 shown and the gear mechanism 93 thereof causes rotor 94 to move along the tapered resistor 95 and introduce a resistance proportional to the mantissa of log 5 into the bridge A.

For purposes of explanation, it will be assumed that the tapered resistors 86 and 95 have a resistance of 1,000 ohms each and that each is tapered in such a way that when dials 85 or 92 show a certain number, the tapered resistance dialled off in the tapered resistor is proportional to the mantissa of the log of that number. For instance, if the number 5 appears on a dial, the resistance which would be introduced into the bridge circuit A by the tapered resistor under consideration would be a value corresponding to log 5 or approximately 699 ohms (log 5 equals .69870). Similarly, if the number 5 is introduced in the second dial, a similar resistance is further introduced into the bridge A and the total resistance on one side of the bridge will be 1,398 ohms. The current responsive amplifier 96 in the bridge A controls the operation of the motor 97 to cause the shaft 98 of the result indicator E to rotate and move the dial mechanism 99 continuously until the gearing 100 causes the rotor 101 to tapered resistor 102 to describe a balancing resistance of 1,398 in bridge A derived from 398 ohms in resistor 102 plus 1000 ohms from the characteristic carry over mechanism F operative thereby and described in more detail hereinafter.

As the tapered resistor 102 is also tapered in such a manner that the response is proportional to the mantissa of the log of the number which appears on the indicator dials 99, then when the rotor or slider 101 thereof comes to rest at approximately 398 ohms, the number 25 will appear on the dial mechanism 99.

The decimal point is solved by the bridge circuit B. Preferably the decimal indicator in the entry dial devices C and D is in the form of an indicator member 103 and 104 respectively, mounted on blocks 105 and 106, movable along the screw 107 and 108 by means of the manually adjusting knobs 109 and 110 within the guide ways 111 and 112. For the purpose of discussion, it will be assumed that each of the contacts 113 and 114 are separated from adjacent ones by a resistance of 1,000 ohms, the contacts being mechanically spaced equivalent to the spacing of the longitudinal spacing of the numeral arrangement on the dials 85 and 92. In the positions of the decimal adjustments shown, 3,000 ohms will be entered into the bridge circuit B by each of the entry dial mechanisms C and D by virtue of the sliders 115 and 116 engaging the contacts shown. In this example, therefore, 6,000 ohms will be introduced into one arm of the bridge circuit B and the current responsive amplifier 117 will cause the motor 118 to rotate the screw 119 and cause movement of the slider 120 to engage a contact 121 within the series of contacts 122 of the result indicator E to cause the mechanism to introduce 6,000 ohms in the opposed arm of the bridge. In this case, however, the decimal indicator 123 would give a reading of 2.5. It is necessary, therefore, to employ a carry-over mechanism according to the invention which is indicated generally by the letter F.

It will be observed that the shaft 124 extending from rotor 101 carries the one revolution gear 125 engaging the toothed wheel 126 driving gear 127 running along the rack 128 carrying sliders 129 and 130 in respect to the contacts 131, 132, 133 and 134. The contacts 131 and 132 have a resistance of 1,000 ohms therebetween which, in the position of slider 129 shown, is disposed in the balancing arm of the bridge B. Similarly, the contacts 133 and 134 have a suitable resistance therebetween which is shown in series with the resistance of tapered resistance 102 of the result indicator in the balancing arm of the bridge A for the position of the slider 130 shown. The carry-over device F is thus arranged to add or subtract 1,000 ohms to the characteristic bridge B when the rotor 101 of tapered resistance 102 of the result indicator makes more than one revolution. Therefore, if the sum of the two resistances entered by the decimal entry dial mechanisms is greater than 1,000 ohms, the rotor 101 will move clockwise until it has introduced 1,000 ohms in the balancing side of the characteristic bridge circuit B. As the rotor 101 passes the zero position or terminal end of the resistance 102, the transfer device F, through the slider 129 and gear mechanism 125, 126 and 127, will cause a further 1,000 ohms to be entered into the characteristic bridge circuit B and also into the mantissa bridge circuit A by reason of the engagement of slider 130 with the contact 134.

When the motor 97 governing balancing of the mantissa bridge circuit A causes one revolution of the rotor 101 of the tapered resistance 102, 1,000 ohms as represented by resistance 135, is added into the characteristic bridge circuit B in series with the resistances entered by the decimal entry mechanisms. Therefore, the characteristic bridge circuit has 3,000 ohms derived from the decimal point of the first factor and 3,000 ohms derived from the decimal point of the second factor, as well as 1,000 ohms added by the carry-over mechanism F. There is therefore a total of 7,000 ohms introduced, which must be balanced by the slider 120 engaging the appropriate contact of the series 122 as determined by drive of the screw 119 by the motor 118. The motor will cause the slider to be moved 7 positions to engage the contact 121 to balance the bridge B at which position the decimal indicator 123 will arrive at the position illustrated to give the proper reading of 25.

The mechanism can therefore perform the multiplication of 5×5 including the decimal point.

If it is desired to multiply 5,000 by 50, then when the number 5 is introduced into one of the numerical entry devices, a total of 1,396 ohms will be introduced into the mantissa bridge circuit A. The motor 97 will be actuated to cause the rotor 101 to make one revolution and the carry-over device F will cause 1,000 ohms to be added to the mantissa bridge A and the characteristic bridge B. Therefore, the digits 25 will appear in the result indicator E. However, when the decimal entry device is moved to show 5,000 in the entry device C and 50 in the entry device D, the first will introduce 6,000 ohms and the second a further 4,000 ohms into the characteristic bridge B. There will therefore be a total of 10,000 plus the 1,000 from the carry-over device F, giving 11,000 ohms introduced into the characteristic bridge. The motor 118 will cause the slider 120 to move to a position to balance this value or 11 positions from the left and indicate the result in the result indicator E as 250,000. The computation, including a decimal point, may therefore be performed automatically.

Figure 6:
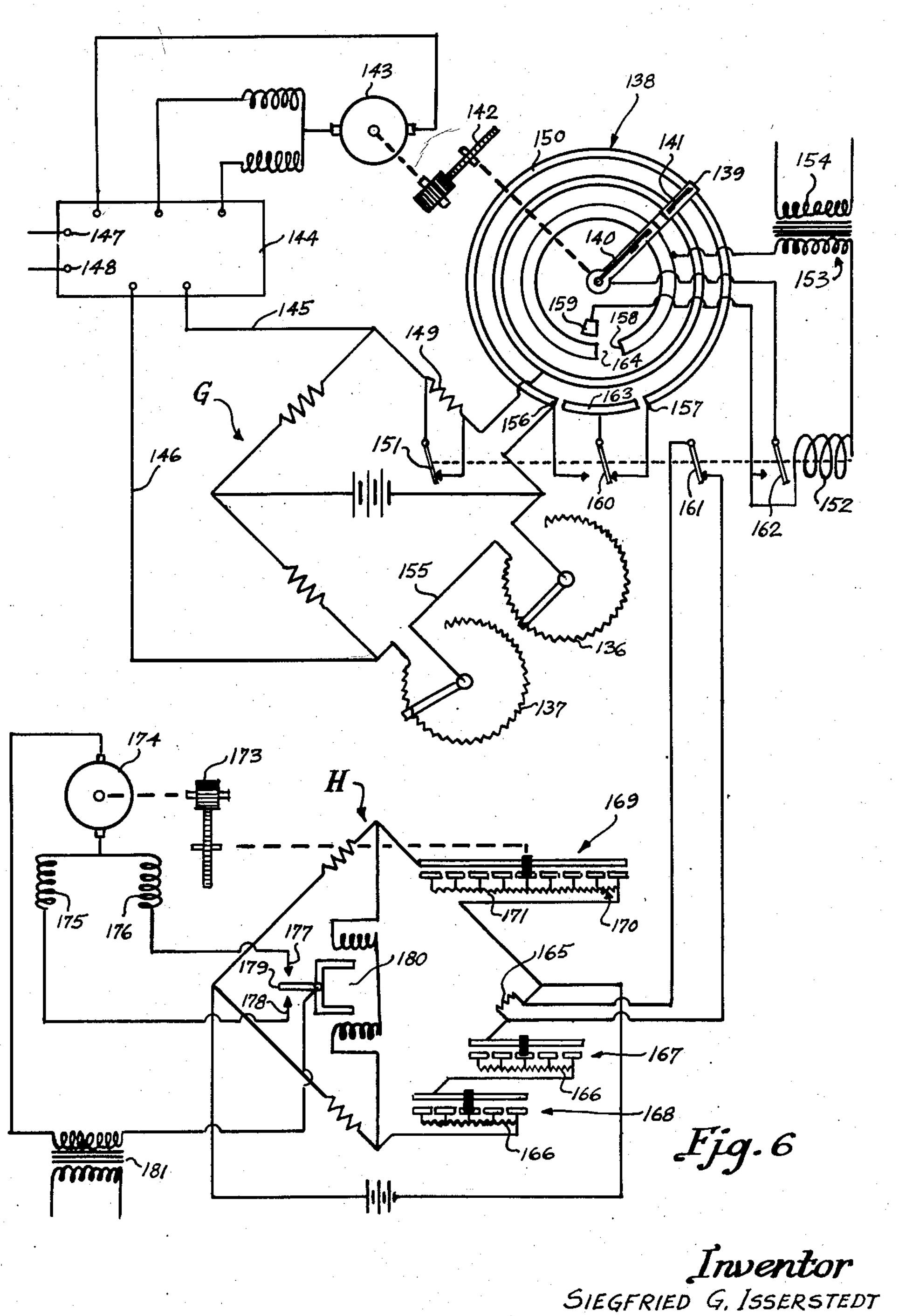
Figure 6 is a schematic illustration of a modified form of the computer according to the invention wherein the carry-over device is embodied in an electrical system.

In Figure 6, a modification of a practical device having electrical computing instrumentalities is illustrated wherein the carry-over device is of electrical nature. The mantissa bridge G has mantissa entry dial mechanisms (not shown) governing the value of the variable resistances 136 and 137 which are balanced by the balancing variable resistance device 138 having a movable arm 139 which includes a switch contact brush 140 and a resistance slider 141, the arm being rotatably driven through gear mechanism 142 by a split field series motor 143 driving an amplifier 144 governed in its operation by the output of the bridge G and the direction of current flow therein in the connecting lines 145 and 146. The amplifier is supplied by a separate source of power applied to the terminals 147 and 148.

The balancing of resistances 136 and 137 also involves the resistance 149 which has a value equal to the total value of one of the resistances 136 and equal to the total resistance of the outer resistance ring 150 of the resistance device 138. A shorting switch member 151 is governed in its operation by the relay 152 energized by transformer 153 having a suitable source of voltage applied to its primary 154.

Where the total value dialed off in the arm 155 of the bridge G in the adjustment of resistances 136 and 137 corresponding to the entry of factors entered into the computer exceeds the total value of one of these resistors, the arm 139 will be caused to rotate in a clockwise direction from the zero point of the resistances 150 at 156 around past the end 157 of this resistance. The brush 140 of the arm 139 will thus disengage from the inner ring contact 158 whereby, upon coming into engagement with the contact 159, it will cause energization of the relay 152 and movement of the switch arms 151, 160, 161 and 162 to the opposite positions from that illustrated in the drawings. The switch arm 162 will remain in this position to complete the circuit of the relay 152 as the arm 139 continues past its one revolution to dial off the remainder of the resistance to complete the sums of the resistances. The final resistance value will be equivalent to that dialed off in the entry resistances 136 and 137 since the resistance 149 will now be in series circuit with the variable resistance device 138. The switch arm 160 is arranged in conjunction with the contact segment 163 so that the resistance slider 141 is not disposed to start again from zero until the resistance 149 is switched in series therewith in an operation where the arm 139 makes more than one revolution.

If the total resistance in the arm 155 is reduced by adjusting the resistances 136 and 137 to a total value of less than the value of either after the above operation has been carried through, then the arm 139 merely moves counterclockwise. As the brush 140 thereof passes the gap 164 the relay 152 will be de-energized causing the resistance 149 to be shorted by the switch arm 151 and the arm 139 will continue in its counter-clockwise movement until a value is reached to balance the sum of the resistances in the arm 155.

The bridge H is employed for the decimal computation wherein the carry-over resistance 165 is equal to each of the resistant increments 166 in the decimal entry variable resistance devices 167 and 168. The decimal result indicating device 169 embodies the variable resistance mechanism 170 having incremental resistances 171 of a value equal to the resistances 165 and 166. The slider 172 is operatively driven through gear mechanism 173 actuated by the split field series motor 174 energized by either of the fields 175 or 176 making electrical contact through contacts 177 or 178 with the armature 179 of the reversible relay 180 which is sensitive to the direction of current flow therethrough and which through its armature and contacts controls the energization of the motor 174 and the supply of current thereto by the transformer 181.

In operation, the decimal entry devices are adjusted along with the adjustment of the numerical entry resistances 136 and 137 to enter the desired factors into the calculator and if the sum of the mantissae entered is greater than 1, the arm 139 will proceed past its point of one revolution causing the resistor 149 to be active in the bridge G and the resistor 165 to be placed in series with the values of resistances from the devices 167 and 168 in the bridge H. It will be appreciated, therefore, that the relay 152 in conjunction with the switching mechanism of the variable resistance device 138 constitutes the carry-over device of the invention enabling characteristic derived by the sum of mantissae where occurring to be carried over and added to the sum of the characteristics handled in the decimal computation.

The amplifier 144 operated by the bridge G in a very crude apparatus could be in the form of a relay such as the relay 180 in the bridge H having the same general characteristics of operation, but it will be realized that greater sensitivity will be required having regard to the number of significant figures desired when handling logarithmic values of resistance as in the analog computer portion of the whole circuit. The amplifier 144 may be of conventional form employing electronic amplifiers to actuate suitable relays to give the desired operation, in clockwise or anti-clockwise motion of the arm 139.

Having reviewed specific embodiments of this invention it will be appreciated that the detailed character of any of the components of apparatus in accordance with the teachings herein may be considerably modified taking into account the general principles set forth. The devices illustrated show the handling of two factors only, but the extension of these teachings to the provision of a device for handling a larger number of factors will be readily apparent to skilled persons since such would be substantially a multiple of the arrangements shown. For instance, in Figure 6, the total value of resistance 138 could have been set as equal to the sum of the total values of the resistances 136 and 137 in which case the resistance 149 could have been eliminated. In such instance, however, after one-half revolution of the arm 139 the resistance 165 would have to be brought into circuit with the resistance devices 167 and 168 in the bridge H. Further, the result indicator dial showing the resulting numbers or digits would have to make two revolutions for every one revolution of the arm 139 and suitable gearing for this would have to be provided.

It is also possible, however, to have a number of carry-over balancing resistors such as the resistor 149 each separately controllable in that arm of the bridge by a separate relay but wherein the number of such resistances is equal to one less than the number of analog entry resistances such as resistances 136 and 137. In each consecutive revolution of the arm 139, however, consecutive carry-over balancing resistors would have to be switched in in accordance with the arrangement illustrated in simple form in Figure 6 in the device 138 involved in the relay 152.

It will be clearly realized that the present invention is substantially independent of the particular form of analog computing instrumentalities and decimal computing instrumentalities employed and that it relates to the combination therewith of a carry-over device for the characteristic whereby the decimal point may be shown in a result indicator for a computation involving the handling of two or more factors by multiplication or division or both operations simultaneously. It is intended, therefore, that the present disclosure should not be construed in any limiting sense other than indicated by the scope of the following claim:

What I claim as my invention is:

An electrically operated computer of the logarithmic type, comprising in combination: an electrical bridge circuit having at least a pair of adjustable resistors adjustable in accordance with the magnitude of the logarithm of the digits to be entered into the computer for a multiplication operation; a digital result indicator including a movable element responsive to the direction and magnitude of electrical current flow and including a balancing resistor electrically connected in said bridge for balancing the additive effect of said adjustable resistors; a second electrical bridge circuit arrangement including at least a pair of adjustable resistors comprising one arm of the bridge and adjustable in accordance with the desired entry of a decimal point in a computation; a decimal result indicator responsive to the magnitude and direction of electrical current flow and having balancing resistor means electrically connected in said second bridge circuit and designed to balance the additive effect of the adjustable resistors thereof; a carry-over resistance in the said one arm of the said second electrical bridge circuit arrangement; a normally closed carry-over switch device effectively electrically shunting said carry-over resistance; and means responsive to predetermined movement of the movable element of said digital result indicator for effectively opening said normally closed carry-over switch.

SIEGFRIED GORDON ISSERSTEDT.

References Cited in the file of this patent

UNITED STATES PATENTS

| Number | Name | Date |
|---|---|---|
| 2,108,146 | Simpson | Feb. 15, 1938 |
| 2,426,601 | Eckel | Sept. 2, 1947 |
| 2,467,419 | Avery | Apr. 19, 1949 |
| 2,497,208 | Coggeshall | Feb. 14, 1950 |
| 2,527,734 | Isserstedt | Oct. 31, 1950 |

FOREIGN PATENTS

| Number | Country | Date |
|---|---|---|
| 625,023 | Great Britain | June 21, 1949 |